March 11, 1969  J. H. LEMELSON  3,432,326
METHOD FOR COATING PIPE
Original Filed May 28, 1956
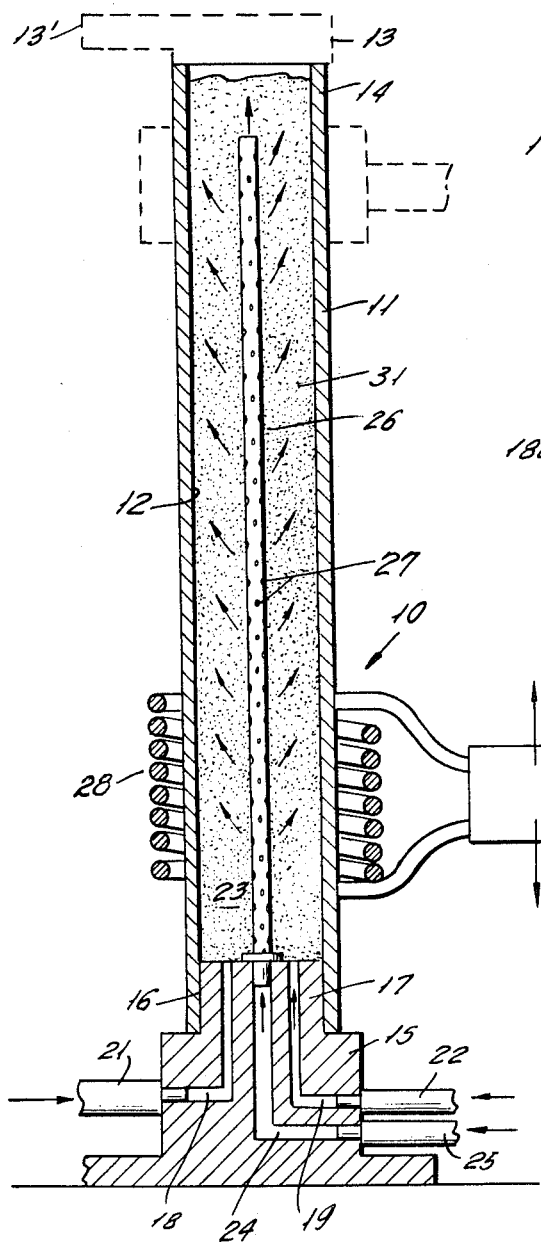
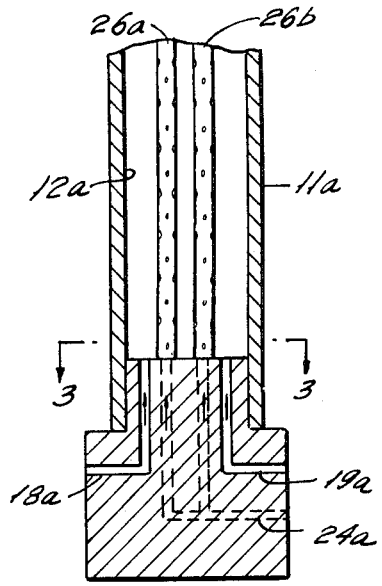
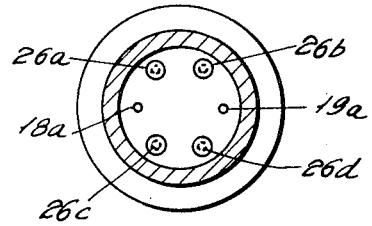
INVENTOR.
JEROME H. LEMELSON
BY
OSTROLENK, FABER, GERB & SOFFEN
ATTORNEYS.

United States Patent Office 3,432,326
Patented Mar. 11, 1969

3,432,326
METHOD FOR COATING PIPE
Jerome H. Lemelson, Metuchen, N.J., assignor to The Dow Chemical Company, Midland, Mich., a corporation of Delaware
Application Apr. 28, 1961, Ser. No. 112,148, now Patent No. 3,218,184, which is a division of application Ser. No. 589,848, May 28, 1956, now Patent No. 3,166,829. Divided and this application Sept. 23, 1965, Ser. No. 489,599
U.S. Cl. 117—18       6 Claims
Int. Cl. B44d *1/095;* B05c *7/04*

This application is a division of my copending application Ser. No. 112,148, filed Apr. 28, 1961, now United States Patent No. 3,218,184, which application in turn was a division of application Ser. No. 589,848, filed on May 28, 1956, now U.S. Patent No. 3,166,829.

This invention relates to an apparatus and method for coating pipe, tubing, or other elongated hollow articles with thermoplastic particulate materials, and more particularly to such an apparatus and method for applying the thermoplastic material to the article to be coated from suspension in a fluidized bed.

Particulate plastic materials have been applied as coatings to various articles by immersing such articles, heated to temperatures in excess of the melting points of the coating materials, within fluidized beds formed in suitable containers. Such beds are conventionally produced by introducing air or other fluidizing gas into the bottom of the coating container under conditions sufficient to fluidize the particulate coating material contained therein.

While such treatments have been successful in applying coatings to the surfaces of articles having relatively small dimensions, difficulties have been experienced when the articles to be coated possess relatively large dimensions, the fluidizing gases thus introduced being capable of producing a fluidized bed of only a limited depth.

It is therefore among the objects of the present invention to provide an apparatus and method for effecting the complete coating of an elongated article, e.g., a piece of pipe or tubing, with a thermoplastic particulate material applied by means of a fluidized bed coating technique.

A further object of the invention is to provide such an apparatus and method for forming substantially uniform thickness coating layers on the interior of elongated hollow articles.

Other objects and advantages of the invention will be apparent from the following detailed description thereof, taken in connection with the accompanying drawing, in which:

FIGURE 1 is a vertical section through one embodiment of the apparatus of the invention;

FIGURE 2 is a partial vertical section through a further embodiment thereof; and FIGURE 3 is a horizontal section viewed in the direction of line 3—3 in FIGURE 2.

In carrying out the coating method of the present invention the walls of an elongated hollow article are coated with a particulate thermoplastic material, e.g., nylon or polyethylene, by suspending the particles of the thermoplastic material in a fluidized bed formed adjacent the elongated article and heating the article at a temperature above the melting range of the thermoplastic material to fuse at least a portion of the thermoplastic particles to the article walls and thereby produce a coating thereon. In accordance with my invention, the fluidized bed is produced by depositing a mass of the thermoplastic material adjacent the hollow article and introducing a fluidizing gas, e.g., air, into the particulate mass adjacent the base thereof and at a plurality of points displaced longitudinally of the mass to thereby provide the desired fluidized bed throughout the entire length of the walls of the article to be coated.

By thus introducing the fluidizing gas at points intermediate the length of the walls of the article to be coated, a fluidized mass is maintained throughout a far greater depth than was heretofore found possible, employing conventional fluidized coating equipment in which a fluidizing gas is introduced adjacent the base of the reaction zone. The maintenance of a fluidized bed throughout the length of the article to be coated and the consequent production of a coating having a substantially uniform thickness, is thus assured.

It will be understood that, while the following specific description is directed to the coating of the internal walls of elongated articles, the invention is similarly applicable to the external coating of such articles by placing them in the fluidized bed formed as described hereinafter extending throughout the entire length of the articles to be coated.

Turning to the drawings, an apparatus 10 is illustrated in FIGURE 1 for providing a coating on the inside surface 12 of an elongated tube or pipe 11. The pipe 11 is maintained in a vertical position by means of a clamp 13 securing the pipe at the upper end 14 thereof, and a base 15 so shaped as to support the lower end 16 of the pipe. The clamp 13 may be supported, for example, by an arm 13' which may be secured in turn to any suitable conveying or transfer device.

The base 15 includes an upwardly extending plug section 17 shaped to substantially seal the lower end 16 of the pipe 11 when assembled therewith. A plurality of passageways 18 and 19 are defined within the plug section 17, connected to pressurized gas lines 21 and 22, respectively. The passageways 18 and 19, it will be noted, communicate with the base of an elongated chamber 23 defined within the pipe 11 above the plug section 17.

A further passageway 24 extends through the walls of the base 15 communicating at one end with the base of the chamber 23 and at the opposite end with a pressurized gas line 25. Mounted within and extending axially of the chamber 23 is an elongated tube 26, the lower end of which is connected to passageway 24. A number of holes 27 are provided along the length of the tube 26, opening outwardly and upwardly from the tube to permit air or other fluidizing gas passed through line 25 into passageway 24 and through the elongated tube 26 to effect the production of a fluidized bed lengthwise of the chamber 23, as described in more detail hereinafter.

An induction coil 28 is illustrated, circumscribing the pipe 11 and movable longitudinally thereof on a support 29. The support 29 may be supported, for example, by an arm 29' which may be secured in turn to any suitable power-driven dolly or fixture.

In operation, the pipe 11 may be preheated to a desired temperature in an oven, gripped by the clamp 13 and transported by the supporting arm 13' therefor into position on base 15 as illustrated in the drawing. The pipe 11, the lower end 16 of which is plugged by plug section 17, is thereafter filled to a predetermined height with a quantity of powdered or pulverized plastic particles 31, e.g., constituted of nylon or polyethylene.

The walls 12 of the pipe 11 may be maintained at a temperature in excess of the melting range of the thermoplastic material by additionally utilizing the heating coil 28 and traversing the same lengthwise of the pipe 11 during the coating operation. By appropriately adjusting the energy dissipated and the rate of traversal of the induction coil longitudinally of the pipe, the internal wall 12 thereof is maintained at a substantially uniform temperature to thereby facilitate the production of a uniform coating thereon.

Upon feeding air through gas lines 21 and 22 through passageways 18 and 19, and into the base of the mass of plastic particles 31 a fluidized bed is produced in the lower portion of the chamber 23. In accordance with the invention, air is fed through pressure line 25, passageway 24, and tube 26, and introduced into the mass of plastic particles 31 at a number of spaced points along the length of the tube, adjacent the openings 27 therein.

The introduction of the fluidizing gas at many points intermediate the length of the chamber 23 maintains the plastic particles 31 in the fluidized state throughout the length of the chamber. It has been found that, by thus maintaining a fluidized bed lengthwise of the walls 12 to be coated, the plastic particles do not cake or deposit unevenly or create unequal heat distribution, thus preventing localized melting or fusing of varying amounts of the plastic particles. Only the particles adjacent the walls fuse thereon, forming a coating having a substantially uniform thickness, and this without melting or changing the state of the particulate thermoplastic material in the core of the fluidized bed.

After the coating action is completed, the induction coil 28 may be disengaged from the pipe 11, the pipe inverted and the residual thermoplastic particles 31 removed therefrom by gravity, or by an appropriate air blast. The resulting coated article possesses a substantially uniform plastic coating throughout the length of the walls 12 thereof.

As shown in FIGURES 2 and 3, the elongated tube 26 may be replaced by a plurality of such tubes 26a, 26b, 26c and 26d mounted, for example, in a circular array, the holes in the several tubes directing the air, or other fluidizing gas passed therethrough, upwardly and outwardly to produce the desired uniform fluidized bed throughout the length of the walls 12a to be coated.

Since the foregoing and other changes may be made in the specific embodiment of the apparatus and method described above, without departing from the scope of the invention, it is intended that the preceding description and the accompanying drawing be taken as illustrative and not in a limiting sense.

I claim:

1. Method for surface coating metal objects which comprises forming a fluidizable mass of finely divided solid particles of a fusible organic resinous coating material, said mass being at least as deep as the portion of said object intended to be coated; fluidizing said mass by passing a stream of an inert gas at a fluidizing rate upwardly through said mass while maintaining the average temperature of the mass below the softening temperature of the solid particles therein; contacting a metal object to be coated with said fluidized mass; inductively heating said metal object while it is in contact with said fluidized mass by subjecting it to the influence of an alternating high frequency magnetic field to generate sufficient heat on the surface of said object to fuse contacting and contiguous particles of said organic resinous material and form a coated, enveloping layer of said fused particles on the surface of said metal object; and then removing said coated object from contact with said fluidized mass and the influence of said magnetic field and cooling it to a normal temperature.

2. A process which comprises coating the inside of a pipe with a thermoplastic material, said pipe having been fabricated from material capable of being heated by induction, which process comprises maintaining a fluidized mass of said thermoplastic material in particulate form within said pipe and in contact with the inner walls thereof and inductively heating the surfaces to be coated within said pipe above the softening point of the thermoplastic material during the contacting of said fluidized mass with the surfaces to be coated.

3. A process for coating the interior surface of a metal pipe with a thermoplastic coating material, which process comprises maintaining within said pipe and in contact with the inner walls thereof a fluidized mass of said thermoplastic material in particulate form and inductively heating the inner walls of said pipe above the softening point of said thermoplastic material during the contacting of said fluidized mass with said inner walls to effect adherence of said thermoplastic material to said inner walls and coating of said walls by a continuous coating of said thermoplastic material.

4. A process according to claim 3 wherein said thermoplastic material is a normally solid polymer of an olefin.

5. A process according to claim 4 wherein said polymer is a polymer of ethylene.

6. A process according to claim 3 wherein said fluidized mass of said thermoplastic material is maintained fluidized by passage of an inert gas therethrough.

References Cited

UNITED STATES PATENTS

| 2,750,681 | 6/1956 | Berry | 34—57 |
| 2,768,095 | 10/1956 | Tadema et al. | 117—100 |
| 2,786,280 | 3/1957 | Gishler et al. | 34—57 |
| 2,880,109 | 3/1959 | Current et al. | 117—21 |
| 3,004,861 | 10/1961 | Davis | 117—18 |
| 3,063,860 | 11/1962 | Gemmer | 117—21 X |

FOREIGN PATENTS

| 643,539 | 9/1950 | Great Britain. |
| 1,051,175 | 2/1959 | Germany. |

WILLIAM D. MARTIN, *Primary Examiner.*

THEODORE G. DAVIS, *Assistant Examiner.*

U.S. Cl. X.R.

117—21